(12) United States Patent
Smith et al.

(10) Patent No.: US 8,590,380 B2
(45) Date of Patent: Nov. 26, 2013

(54) VIBRATION TEST ARRANGEMENT

(75) Inventors: Stephen J Smith, Derby (GB); Philip D Blavins, Derby (GB); Andrew T Backler, Derby (GB)

(73) Assignee: Rolls-Royce PLC, London (GB)

( * ) Notice: Subject to any disclaimer, the term of this patent is extended or adjusted under 35 U.S.C. 154(b) by 332 days.

(21) Appl. No.: 12/919,874

(22) PCT Filed: Feb. 18, 2009
(Under 37 CFR 1.47)

(86) PCT No.: PCT/GB2009/000423
§ 371 (c)(1),
(2), (4) Date: Apr. 22, 2011

(87) PCT Pub. No.: WO2009/112796
PCT Pub. Date: Sep. 17, 2009

(65) Prior Publication Data
US 2012/0073373 A1 Mar. 29, 2012

(30) Foreign Application Priority Data

Mar. 12, 2008 (GB) .................................. 0804484.4

(51) Int. Cl.
*G01M 7/06* (2006.01)
(52) U.S. Cl.
USPC .............................................. 73/584; 73/571
(58) Field of Classification Search
USPC .......................................... 73/584, 571, 577
See application file for complete search history.

(56) References Cited

U.S. PATENT DOCUMENTS

| | | | |
|---|---|---|---|
| 4,912,980 A * | 4/1990 | Baughn | 73/663 |
| 5,621,955 A | 4/1997 | Schmid et al. | |
| 6,396,826 B1 * | 5/2002 | Ohlson et al. | 370/342 |
| 6,732,591 B2 * | 5/2004 | Miles et al. | 73/808 |
| 7,204,153 B2 * | 4/2007 | Phipps | 73/808 |
| 7,204,161 B2 * | 4/2007 | Juranitch et al. | 73/862.322 |

FOREIGN PATENT DOCUMENTS

| | | |
|---|---|---|
| GB | 545476 | 5/1942 |
| JP | A-2002-236074 | 8/2002 |
| JP | A-2003-270081 | 9/2003 |

OTHER PUBLICATIONS

International Search Report for International Patent Application No. PCT/GB2009/000423, mailed on Jun. 16, 2009.
Written Opinion for International Patent Application No. PCT/GB2009/000423, mailed on Jun. 16, 2009.
British Search Report for corresponding British Patent Application No. 0804484.4, date of search: Jul. 4, 2008.

\* cited by examiner

*Primary Examiner* — J M Saint Surin
(74) *Attorney, Agent, or Firm* — Oliff & Berridge, PLC

(57) ABSTRACT

Testing of components for fatigue under vibration conditions is important. Typically an isolation device is utilized in order to isolate a mode of vibration of interest. Isolation is through engaging a node line utilizing isolation elements. By presenting the isolation elements in arms a component can be isolated by engaging the component to one side. The isolation elements are suspended upon springs and allowed to move axially in the direction of the springs as well as laterally through mountings in the arms. The isolation elements are less acceptable to wear and test set up time is reduced by the engaging of component to one side only of the component.

20 Claims, 2 Drawing Sheets

VIBRATION TEST ARRANGEMENT

The present invention relates to vibration test arrangements and more particularly vibration test arrangements utilised with regard to components such as aerofoils utilised in rotors of a gas turbine engine.

It will be understood that a large number of components require testing to determine their performance in use. One form of testing is fatigue testing and in particular high cycle vibration fatigue testing. With respect to some components such as low pressure compressor blades, eg fan blades, in gas turbine engines their size and thus motions during testing can be severe. It is known to provide isolator devices to assist with respect to high cycle vibration fatigue testing of components and particularly with respect to components having an aerofoil shape. An aerofoil is held in a specific fixture and can be excited in a number of ways and in a particular mode of vibration. Any mode of vibration higher than the first fundamental mode will have node lines which are stationary when the vibration mode is excited. The isolator device is used to inhibit other modes of vibration and isolate the mode of vibration of interest by resting against the node line on the aerofoil so causing that part of the aerofoil to be stationary encouraging the mode of vibration of interest to be excited when the method of excitation is switched on.

FIG. 3 illustrates a typical prior test arrangement 1 for an aerofoil 2 of a blade component. Two isolator devices 3, 4 are located upon a node line 5 of a mode of vibration of interest. As indicated above the isolation devices 3, 4 are presented upon the node line 5 in order to isolate the mode of vibration of interest. The prior isolation devices 3, 4 act against parts of the aerofoil 2 and must absorb relatively large values of vibration energy as well as untwisting actions along the node line 5 during motion of the aerofoil 2. As indicated above the aerofoil 2 is generally a low pressure compressor blade, eg a fan blade, from a gas turbine engine. The isolation devices 3, 4 comprise an elastomeric and typically rubber element having a cut edge or point to engage the aerofoil 2. The elastomeric element is held in a rigid clamp for presentation to the aerofoil 2.

By providing isolation devices 3, 4 which are rigid in nature it will be understood that there is generally a rapid wear of the rubber tip in engagement with the aerofoil 2. Such rapid wear results in instability in the mode of vibration and therefore a potential necessity to abort a test before full duration of a test cycle has been achieved. It will also be understood that test set up times can be lengthy due to the requirement to locate both isolation devices 3, 4 through their isolator element edges in alignment with the node line 5.

Prior isolation devices utilised in vibration test arrangements have limitations.

In accordance with aspects of the present invention there is provided a vibration test arrangement for a component, the arrangement comprises an isolation device having a first isolation member provided on a first arm and a second isolation member provided on a second arm, the first arm and the second arm are mounted with a spring association to provide an isolation abutment pressure between the first isolation member and the second isolation member and to allow axial movement of each isolation member in the direction of the spring association.

Also in, accordance with aspects of the present invention there is provided an isolation device for a vibration test arrangement having a first isolation member provided on a first arm and a second isolation member provided on a second arm, the first arm and the second arm are mounted with a spring association to provide an isolation abutment pressure between the first isolation member and the second isolation member and allow axial movement of each isolation member in the direction of the spring association.

Typically, the spring association has an adjuster to vary the isolation abutment pressure.

Typically, one or each of the arms has an aperture, the or each isolation member is arranged in the aperture in the respective arm, the aperture is configured to allow lateral movement of the isolation member relative to the axial movement. Typically, the aperture has a size greater than the isolation member. Possibly, the aperture is formed from material arranged to allow deformation of the aperture about the isolation member.

Typically, the first arm and the second arm are connected by a hinge. Possibly, the spring is arranged intermediate the hinge and respective ends of the arms which have the isolation members. Typically, the adjuster is arranged intermediate the hinge and respective ends of the arms to present the isolation members.

Alternatively, the first arm and the second arm are arranged on a post. Generally, the first arm and the second arm are arranged on the same post. Generally, the first arm and the second arm are substantially parallel to each other. Generally, the spring association is provided upon the post. Generally, the adjuster is associated with the post. Possibly, a guide post is provided to ensure retention of orientation of the arms.

Typically, the adjuster comprises a displaceable member. Generally, the spring association comprises a mechanical spring, a hydraulic spring or a pneumatic spring.

Generally, the isolation abutment pressure is arranged to be sufficient to clamp the component. Typically, the component is an aerofoil. Generally, the aerofoil is part of a gas turbine engine compressor blade or a part of a gas turbine engine fan blade. Generally there are means to vibrate the component and means to hold an end of the component.

Embodiments and aspects of the present invention will now be described by way of example and reference to the accompanying drawings in which:—

As indicated previously provision of rigid isolation elements in the form of cut rubber components at each side of an aerofoil such as a compressor blade, or a fan blade, results in problems with regard to premature wear and potentially spurious results. By aspects of the present invention an isolation device is provided to isolate a vibration mode of interest through engagement to one side only of a component such as an aerofoil.

Figure 3:
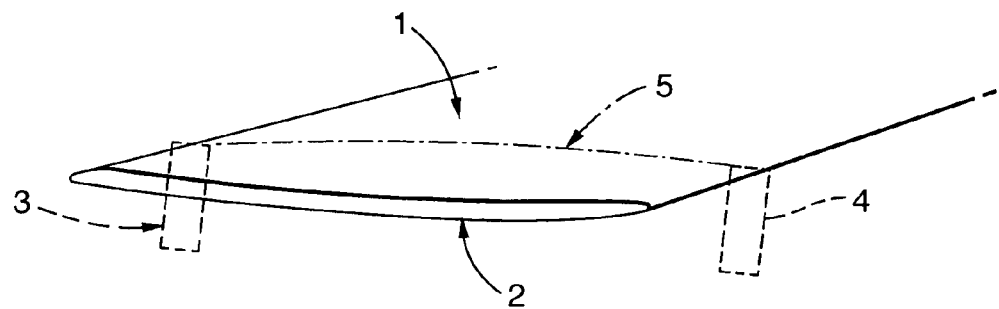
FIG. 3 illustrates a prior vibration test arrangement.
Figure 1:
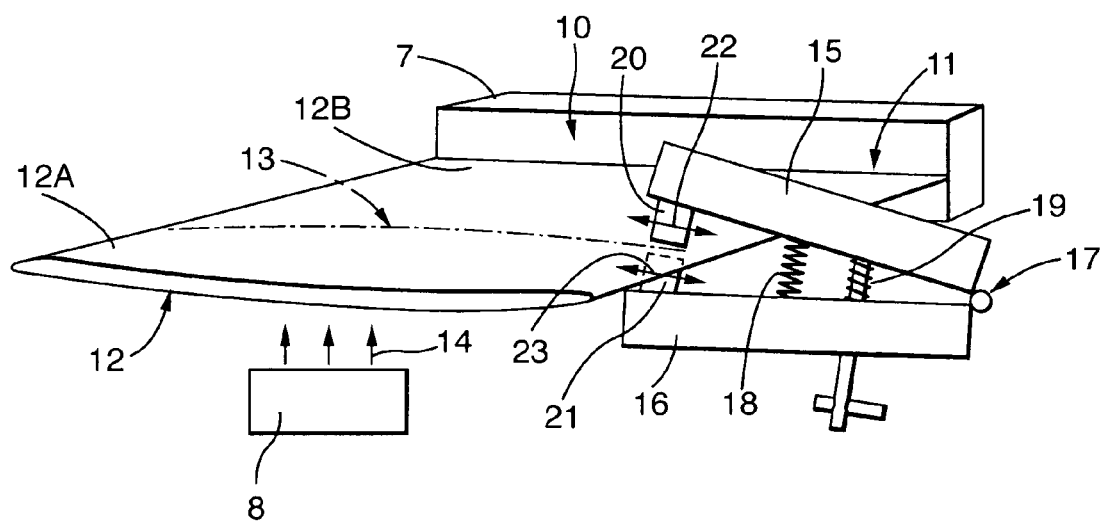
FIG. 1 is a schematic side view of a first vibration test arrangement in accordance with aspects of the present invention.

Referring to FIG. 1 providing a schematic side illustration of a vibration test arrangement in accordance with aspects of the present invention. The arrangement 10 has an isolation device 11 associated with one side or edge of a component 12 about a node line 13 of a desired mode of vibration of interest. Vibration of the component 12 is typically through an appropriate mechanism 8 schematically illustrated by arrowheads 14. The arrowheads 14 indicate high velocity gas, or air, jets which are directed onto the component 12 from the mechanism 8. It will be noted that in comparison with prior arrangements that the isolation device 11 only acts upon one side of the component 12. This component 12 as illustrated is an aerofoil of a compressor blade eg a fan blade, taken from a gas turbine engine. It is to be noted that a first end 12B of the component 12 is held rigidly in a fixture 7 in the case of an aerofoil of a blade, this is the root of the blade. A second end 12A is unrestrained and free to vibrate.

The isolation device 11 comprises a first arm 15 and a second arm 16 associated about a hinge 17 in order to generate, through a spring 18 and an adjuster 19, an appropriate isolation abutment force between isolation elements 20, 21 presented towards ends of the arms 15, 16. This isolation abutment force retains the component 12 in position.

Isolation elements 20, 21 are located and presented from the arms 15, 16 to allow axial movement, that is to say substantially in the direction of the spring 18 as well as lateral, movement relative to the axial direction in the direction of the arrowhead 22, 23. In engagement with the component 12 the axial and lateral movements 22, 23 of the isolation elements 20, 21 will ensure reduced wear and therefore generally give an extended operational life in comparison with prior rigidly presented isolation elements.

In order to appropriately present the isolation elements 20, 21 to engage the component 12 about the node line 13, the spring 18 generates an isolation abutment pressure or force between the elements 20, 21. As illustrated the spring 18 is typically a mechanical spring. However, and alternatively the spring 18 in order to generate the spring association may be a hydraulic spring or pneumatic spring or other spring like elements such as an elastomeric foam element or otherwise. The spring 18 will be loaded by a tension adjuster 19. The spring 18 will keep the arms 15, 16 apart or more normally pull them together with the adjuster 19 regulating the spring 18. Thus, between the spring 18 and the adjuster 19 an appropriate isolation abutment pressure can be generated between the elements 20, 21 to retain and "clamp" the component 12 effectively along the node line 13. Thus, it will be appreciated that the elements 20, 21 effectively achieve double indirect spring loading to generate the abutment pressure to retain and present the component 12.

As indicated above generally the isolation elements 20, 21 will be formed from rubber or an appropriate elastomeric material. The isolation elements 20, 21 will be shaped to have an edge to provide focus with regard to engagement along the node line 13.

In order to achieve the lateral movement in the direction of arrowheads 22, 23 the isolation elements 20, 21 will be positioned in apertures (not shown) within the arms 15, 16. Lateral movement in the direction of arrowheads 22, 23 may be achieved through providing respective apertures which are slightly oversized for the elements 20, 21. In such circumstances there will be a gap between sides of the elements 20, 21 and its aperture to allow the lateral movement in the direction of arrowheads 22, 23. Alternatively, the apertures may be formed from or at least have about the side of the apertures a material which may be deformed when loaded through the elements 20, 21 again to allow lateral movement in the direction of arrowheads 22, 23.

Generally, the isolation elements 20, 21 will be loose within the apertures of the arms 15, 16 presenting them to the component 12. In such circumstances the elements 20, 21 can be readily removed when required and replaced with new elements for further test procedures or if worn or a different isolation member configuration required particularly with regard to the engagement edge to align with the node line 13.

As indicated above the spring 18 will generally be in tension and the adjuster 19 utilised to adjust that tension in order to develop the isolation abutment force between the elements 20, 21. As illustrated one spring 18 may be used or a number of springs used. The adjuster 19 typically comprises a displacement element or structure including a screw thread to allow setting of the configuration and spring association between the arms 15, 16 about the hinge 17.

It will be understood that by arranging the isolation device 11 along one side only of the component 12 there is a reduction in set up times with regard to test procedures in that it is only necessary to align the device 11 through the elements 20, 21 with the node line 13 at that side. Furthermore, by providing the elements 20, 21 as loose fittings or otherwise within mountings of the arms 15, 16 there will be reduction in wear rate upon on the tip edges of the elements 20, 21. Such reductions in wear will prevent early degradation and necessary shutdown of fatigue test vibration operations when wear to the elements 20, 21 is such that other modes of vibration may be excited.

Figure 2:
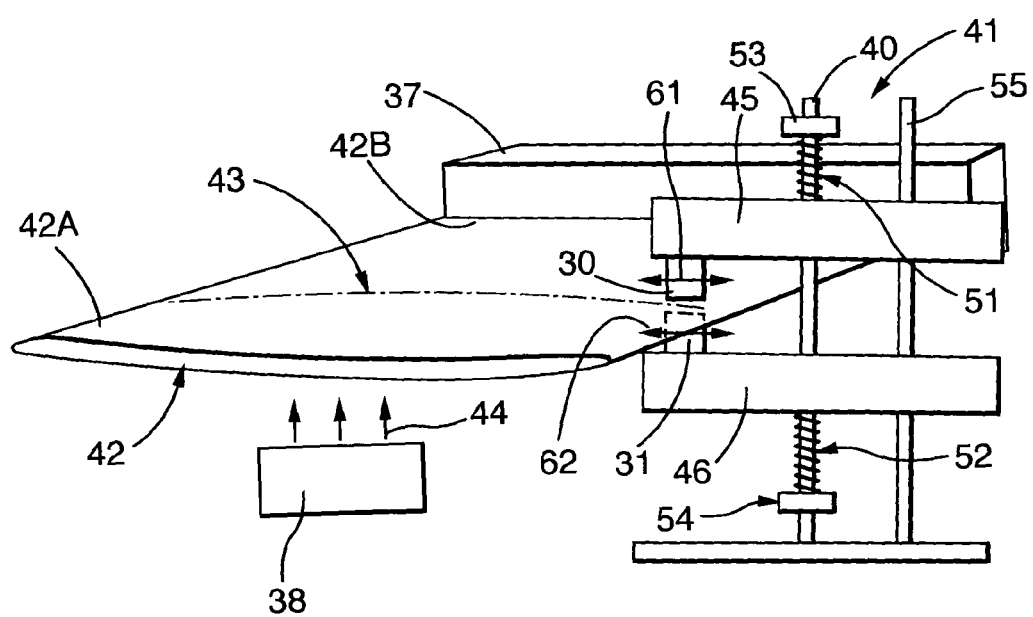
FIG. 2 is a schematic side view of a second embodiment of a vibration test arrangement in accordance with aspects of the present invention.

There is an angular presentation of the arms 15, 16 about the hinge 17 and therefore the elements 20, 21 which may be advantageous. For example, with regard to an aerofoil which will have curved surfaces such angular presentation may be beneficial. However, with regard to other components this may be a disadvantage. In such circumstances, as depicted in FIG. 2, in a second embodiment of aspects of the present invention, isolation elements 30, 31 can be presented substantially parallel to each other and therefore an aerofoil 42 as a component, vibrated with a vibration mechanism 38 schematically illustration by arrowheads 44. The arrowheads 44 indicate high velocity gas, or air, jets which are directed onto the component 42 from the mechanism 38. As previously the isolation elements 30, 31 are located about a node line 43 of a mode of vibration to isolate that mode of vibration of interest for test purposes. It is to be noted that a first end 42B of the component 42 is held rigidly in a fixture 37, in the case of an aerofoil of a blade, this is the root of the blade. A second end 42A is unrestrained and free to vibrate.

An isolation device 41 comprises a first arm 45 and a second arm 46 presented upon a pole 40. The pole is associated with respective springs 51, 52 and associated tension adjusters 53, 54. In order to further improve presentation of the arms 45, 46, and therefore the elements 30, 31, a guide or presentation pole 55 may also be used to provide two point presentation of the arms 45, 46.

As previously the isolation elements 30, 31 are generally formed from rubber or another elastomeric material and have an edge to specifically engage along the node line 43. Furthermore, the elements 30, 31 are generally located within ends of the arms 45, 46 to allow axial movement that is to say in the direction of the springs 51, 52 as well as lateral movement in the direction of arrowheads 61, 62. As previously the elements 30, 31 will be subject to less wear than previous isolation elements in isolation devices and, in view of the substantially parallel presentation of the elements 30, 31, possibly less wear than the elements 20, 21 illustrated with regard to the first embodiment of aspects of the present invention in FIG. 1.

An isolation abutment pressure is generated between the elements 30, 31 upon the component 42 along the node line 43. This isolation abutment pressure is generated through the springs 51, 52 subject to appropriate adjustment through the tension adjusters 53, 54. The springs as illustrated are generally mechanical springs extending about the pole 40 to generate respective axial pressure to engage and clamp a side of the component 42 with an isolation abutment pressure. The adjusters 53, 54 are generally displaceable elements possibly displaceable upon a screw thread in order to adjust the tension of the springs 51, 52. As an alternative to using mechanical springs 51, 52 it will be appreciated that hydraulic or pneumatic or an elastomeric material may be utilised.

It is preferred as illustrated in FIG. 2 that the arms 45, 46 are presented substantially parallel on two poles 40, 55 in order to generate stability in a parallel orientation. It will be understood that presenting the arms 45, 46 on a single pole may lead to tilting or otherwise out of the desired parallel orientation. In such circumstances the arms 45, 46 will simply pass through a close tolerance hole or aperture in the respective arms upon the pole 55. Similarly, holes will be drilled or otherwise formed in the arms 45, 46 to accommodate the pole with springs 51, 52 engaging about those holes to generate the necessary isolation abutment pressure.

It is desirable that the springs 51, 52 are associated with the same pole 40 in order to provide greater balance with respect to the abutment pressure generated between the elements 30, 31. If one spring 51 was presented on one pole whilst the other spring was presented upon a further pole such as the orientation or guide pole 55 there may be a reduction in symmetric loading upon on the arms 45, 46 and therefore again distortion from the desired parallel orientation.

As can be seen the arms 15, 16; 45, 46 are generally robust and stable elements to ensure rigidity in presentation of the elements 20, 21; 30, 31 in terms of orientation. However, as indicated above the arms 15, 16; 45, 46 incorporate appropriate mountings typically in the form of apertures in which the isolation elements 20, 21; 30, 31 are located. These mountings will allow the lateral movement in the direction of arrowheads 22, 23; 61, 62 whilst axial movement is allowed through compression and extension of the springs 18; 51, 52. It will be understood that with regard to the second embodiment depicted in FIG. 2 it may be possible to provide springs 51, 52 of different strength or under different tensions provided by the respective adjuster 53, 54. In such circumstances relative mass of a component 42 or other factors in engagement and presentation of the excitation mechanism 44 can be accommodated.

Particular advantages with regard to aspects of the present invention relate to reduced set up time in that the isolation device 11, 44 is only presented to one side of the component, that is to say the aerofoil blade 12, 42. Furthermore, by reduced wear upon the isolation elements 20, 21, 30, 31 it will be understood that these elements will require less replacement in use and it may be that isolation members may last for up to ten times longer compared to prior isolation members. Additionally, by having greater durability with regard to the isolation elements 20, 21, 30, 31 the vibration test arrangements can more predictably operate for a full test cycle avoiding the necessity for premature aborting of testing prior to completion of all the desirable test cycles.

The isolation elements in accordance with aspects of the present invention effectively float upon the spring association as well as within the mountings provided by the apertures in the arms reducing rigidity and therefore wear as indicated above. The isolation members are effectively presented only to one side of the test component and clamped with the isolation abutment pressure. Engagement with the isolation elements aids and reduces the complexity of presenting the isolation device upon a node lined of the desired mode of vibration for testing. The isolation elements are spring loaded and spring tension can be adjusted. It will also be appreciated that with regard to the second embodiment depicted in FIG. 2 excess vibration is not transmitted to a rigid part of the isolation device structure, that is to say hinge 17. In such circumstances less wear should be presented to the isolation device and in particular the isolation elements in accordance with aspects of the present invention.

Modifications and alterations to aspects of the present invention will be appreciated by those skilled in the art. For example, as indicated above several spring associations may be generated through a number rather than individual springs as outlined above. Springs of different types may be combined in order to provide a spring association within an isolation device for desired performance.

The vibration testing and isolation deuce may be used for testing of any type of aerofoil eg fan blades, compressor blades or turbine blades of gas turbine engines.

The component to be tested in held is a fixture, more particularly one end of the component is held in the fixture, and in the case of an aerofoil eg a fan blade, a compressor blade or a turbine blade the root of the blade is held in the fixture. The component is vibrated using any suitable means of producing vibration, for example a device to produce high velocity gas, or air, jets which are directed onto the aerofoil or a shaker device such as an electrodynamic, piezoelectric or magnetostrictive actuator. The component is tested by vibration for fatigue testing or high cycle fatigue testing.

The invention claimed is:

1. A vibration test arrangement for a component, the arrangement comprising:
    a fixture to hold a first end of the component while a second end of the component is unrestrained and free to vibrate;
    a mechanism to vibrate the component; and
    an isolation device arranged to engage the component upon a node line of a mode of vibration to isolate the mode of vibration for test purposes, wherein the isolation device includes:
    a first isolation member provided on a first arm and a second isolation member provided on a second arm, and
    a spring arranged to act on the first arm and the second arm to provide an isolation abutment pressure between the first isolation member and the second isolation member to abut the component along the node line,
    wherein the isolation members are located in the first arm and the second arm to allow movement of each isolation member in the direction of compression and extension of the spring.

2. An arrangement as claimed in claim 1 wherein the spring has an adjuster to vary the isolation abutment pressure.

3. An arrangement as claimed in claim 2, wherein
    the first arm and the second arm are connected by a hinge, and
    the adjuster is arranged intermediate the hinge and respective ends of the arms to present the isolation members.

4. An arrangement as claimed in claim 1 wherein one or each of the arms has an aperture, the or each isolation member is arranged in the aperture in the respective arm, the aperture is configured to allow lateral movement of the isolation member relative to the movement in the direction of compression and extension of the spring.

5. An arrangement as claimed in claim 4 wherein the aperture has a size greater than the isolation member.

6. An arrangement as claimed in claim 4 wherein the aperture is formed from material arranged to allow deformation of the aperture about the isolation member.

7. An arrangement as claimed in claim 1 wherein the first arm and the second arm are connected by a hinge.

8. An arrangement as claimed in claim 7 wherein the spring is arranged intermediate the hinge and respective ends of the arms which have the isolation members.

9. An arrangement as claimed in claim 1 wherein the first arm and the second arm are arranged on a post.

10. An arrangement as claimed in claim 9 wherein the first arm and the second arm are arranged on the same post.

11. An arrangement as claimed in claim 9 wherein the first arm and the second arm are substantially parallel to each other.

12. An arrangement as claimed in claim 9 wherein the spring is provided upon the post.

13. An arrangement as claimed in claim 9 wherein the adjuster is provided on the post.

14. An arrangement as claimed in claim 9 wherein a guide post is provided to ensure retention of orientation of the arms.

15. An arrangement as claimed in claim 1 wherein the adjuster comprises a displaceable member.

16. An arrangement as claimed in claim 1 wherein the spring comprises a mechanical spring, a hydraulic spring or a pneumatic spring.

17. An arrangement as claimed in claim 1 wherein the isolation abutment pressure is arranged to be sufficient to clamp the component.

18. An arrangement as claimed in claim 17 wherein the component is an aerofoil.

19. An arrangement as claimed in claim 18 wherein the aerofoil is part of a gas turbine engine compressor blade or a part of a gas turbine engine fan blade.

20. An arrangement as claimed in claim 1 wherein the first and second isolation members comprise an elastomeric material.

* * * * *